United States Patent
Barnett (10) Patent No.: US 6,973,837 B2
(45) Date of Patent: Dec. 13, 2005

(54) TEMPERATURE COMPENSATED STRAIN SENSING APPARATUS

(76) Inventor: John D. Barnett, The Rising, 120 High Road, Needham, Harleston, Norfolk (GB) IP209LG ( * ) Notice: Subject to any disclaimer, the term of this patent is extended or adjusted under 35 U.S.C. 154(b) by 6 days.

(21) Appl. No.: 10/483,916

(22) PCT Filed: May 21, 2002

(86) PCT No.: PCT/GB02/02378

§ 371 (c)(1),
(2), (4) Date: Jan. 13, 2004

(87) PCT Pub. No.: WO03/006943

PCT Pub. Date: Jan. 23, 2003

(65) Prior Publication Data

US 2004/0159161 A1    Aug. 19, 2004

(30) Foreign Application Priority Data

Jul. 13, 2001    (NO) .................................... 0117085

(51) Int. Cl.⁷ .............................................. G01B 7/16
(52) U.S. Cl. ...................................................... 73/765
(58) Field of Search ................................. 73/765, 766

(56) References Cited

U.S. PATENT DOCUMENTS

| | | |
|---|---|---|
| 2,344,642 A | 3/1944 | Ruge |
| 3,621,436 A | 11/1971 | Wu |
| 3,665,756 A | 5/1972 | Russell |
| 4,287,772 A | 9/1981 | Mounteer et al. |
| 4,299,130 A * | 11/1981 | Koneval ...................... 73/766 |
| 4,430,895 A | 2/1984 | Colton |
| 4,432,247 A * | 2/1984 | Takeno et al. ......... 73/862.623 |
| 4,448,078 A | 5/1984 | Bridges |
| 4,462,018 A * | 7/1984 | Yang et al. ..................... 338/3 |
| 4,836,025 A * | 6/1989 | Mihara ........................ 73/497 |
| 4,841,272 A | 6/1989 | Yamagishi et al. |
| 4,990,986 A * | 2/1991 | Murakami et al. .......... 257/419 |
| 5,294,910 A | 3/1994 | Tani et al. |
| 5,375,474 A * | 12/1994 | Moore, Sr. ................... 73/766 |
| 6,301,775 B1 | 10/2001 | Piazza |
| 6,725,717 B2 * | 4/2004 | Hiebert ..................... 73/204.26 |

FOREIGN PATENT DOCUMENTS

| | | |
|---|---|---|
| EP | 0359132 | 3/1990 |
| GB | 1097761 | 1/1968 |

* cited by examiner

*Primary Examiner*—Max Noori
(74) *Attorney, Agent, or Firm*—Stephen H. Eland; Dann, Dorfman Herrell and Skillman (57) ABSTRACT

A strain sensing apparatus for use in the presence of thermal gradients has a strain gauge and resistance temperature gauge in a planar assembly bonded to, deposited on or diffused or implanted in a substrate surface. The apparatus can sense strain and temperature independently and can be used alone or with a plurality of installations in strain gauge based transducers or experimental stress analysis. The output from the temperature gauge can be used accurately to compensate for unwanted thermal effects in the strain gauge and to measure temperature at the strain gauge site.

20 Claims, 10 Drawing Sheets

TEMPERATURE COMPENSATED STRAIN SENSING APPARATUS

This invention relates to a strain sensing apparatus or installation, and in particular to such an apparatus or installation for use in the presence of thermal gradients.

Strain gauges are well known devices for measuring mechanical strain in engineering materials and they are commonly used in experimental stress analysis and in the manufacture of many kinds of transducer, where the measured parameter is inferred from the strain in a flexural element by strain gauges bonded to it. Pressure transducers, torque cells, load cells and accelerometers are typical examples. Unfortunately most strain gauges are sensitive to strain and temperature, in roughly equal parts, and there are known techniques for compensating strain gauge installations for temperature effects in existence. The most common method is to employ at least two strain gauges in a Wheatstone bridge circuit so arranged that changes in resistance due to strain are reinforced and changes in resistance due to temperature are cancelled. For higher accuracy, the bridge circuit may be combined with a temperature-sensing device, where the latter is used to compensate for secondary errors in the former arising from mismatch of the thermal parameters of the strain gauges and materials within the transducer.

However, these techniques are only effective in isothermal conditions. This is particularly the case when the temperature-sensing device is not in the same position spatially as the strain gauge(s). Such techniques are sufficient for many applications where the isothermal assumption is appropriate or low accuracy is adequate. But in applications where the installation is subject to thermal transients, then quite large zero and span errors can occur during the transient period, caused by thermal gradients in the transducer body. Where the transient is the period of interest the above techniques are not suitable. A typical application of this type is the measurement of engine torque using a torque cell built into the clutch shaft of a racing car during heavy acceleration, when the temperature of the clutch and surrounding components, including the torque cell, rises rapidly.

Furthermore, it is increasingly common in the production of high accuracy transducers to compensate for thermal and other errors using digital techniques. For thermal errors the transducer is calibrated at several points in the relevant thermal spectrum and the output of an integral temperature-sensing device recorded. Compensation is achieved by storing empirical coefficients, acquired during calibration, in digital memory built into the transducer. In service the coefficients are recalled by built-in electronics in accord with the integral temperature sensing device output and are used to correct the transducer output for temperature effects on zero and span. The empirical coefficients are typically acquired under almost isothermal conditions in the factory and the transducer must be used in similar conditions or the stated accuracy will not be maintained. This limits the applications for high accuracy transducers of this type.

In order to address one or more of the above problems, the present invention provides, in a first aspect, a strain sensing apparatus having a strain gauge having a strain sensing area, and a temperature gauge having a temperature sensing area in thermal contact with the strain sensing area, wherein one of the strain sensing area and the temperature sensing area overlies the other.

It is therefore possible substantially to eliminate (for practical purposes) a time lag between the temperature of the strain gauge and the temperature of the temperature gauge. Thus, the temperature of the strain gauge (and preferably of the whole of the strain sensing area) can be accurately monitored by the temperature gauge.

The term "overlie" can be construed here as "overlap". It is to be understood that the orientation of the apparatus, and the relative order of the strain gauge and the temperature gauge do not affect the way in which the invention works.

Advantageous features of the temperature gauge include low thermal mass, allowing the temperature gauge to track temperature changes in the strain gauge with little or no time lag. Typically, low thermal mass can be achieved by making the temperature gauge (or at least the temperature sensing part of the gauge) thin in one dimension, but with a high surface area. Preferably, the temperature gauge is a resistance temperature gauge, i.e. a temperature gauge which relies on a change in resistance of the sensing portion with temperature in order to determine the temperature.

Preferably, the strain sensing area and the temperature sensing area substantially match in size and are overlaid substantially to coincide. This can enhance the temperature-tracking of the temperature gauge with respect to the strain gauge.

Preferably, the strain gauge is bonded to the temperature gauge. Direct bonding (e.g. without an intermediate layer, apart from a bonding layer, if required) may be preferable in order to ensure good thermal contact between the strain sensing area and the temperature sensing area. Typically, strain and/or temperature sensing gauges include a layer to which the sensing area is bonded. This layer may be a dielectric material layer.

The apparatus may include a plurality of strain gauges, each strain gauge having a corresponding temperature gauge as set out in this first aspect of the invention. Each strain gauge may be located at a different site in the apparatus. Some or all of the strain gauges may be arranged in, e.g., a Wheatstone bridge type circuit in order to, e.g., compensate for thermal errors in isothermal and/or non-isothermal and/or thermal transient conditions.

The apparatus may be a transducer, e.g. for stress measurements based on strain measurements in a structure.

Embodiments of the invention may be used, for example, for accurate measurement of thermal stress in a structure, induced by, e.g., a thermal transient. Typically, this is done using one strain gauge with accompanying resistance temperature gauge overlay (or underlay). Typically, the apparatus requires calibration under isothermal conditions. Embodiments of the invention may also be used to measure the average temperature at a site in a structure.

In applications where a Wheatstone bridge circuit is used only for thermal compensation, as in the case of a pressure diaphragm, the function of the Wheatstone bridge circuit (or similarly functioning circuit) can be replaced by, e.g., a single strain gauge with temperature gauge overlay (or underlay), thus saving materials and labour.

Preferably, the strain gauge has a strain sensing pattern and the temperature gauge has a temperature sensing pattern of substantially the same shape, the gauges being overlaid substantially to match the patterns. Matching patterns in this way gives rise to a favourable tracking of the temperature of the strain sensing area by the temperature sensing area.

Alternatively, the strain gauge may have a strain sensing pattern and the temperature gauge has a temperature sensing pattern selected to complement the strain sensing pattern. In that case, the temperature sensing pattern need not be substantially identical to the strain sensing pattern. The temperature sensing pattern may be chosen for a secondary function, e.g. a strain sensing function.

Preferably, the temperature sensing pattern is selected so that, in use, when subjected to a predetermined non-zero strain or to a predetermined non-zero strain format, the temperature gauge has substantially zero net strain output.

Typically, the strain gauge is formed on a substrate by selective deposition. Various deposition techniques may be used, e.g. thin film techniques combined with patterning techniques may be used. The strain gauge may be formed before application to the substrate, e.g. in the form of a foil strain gauge.

Alternatively, the strain gauge may be formed on or in a substrate by selective diffusion into the surface of the substrate. In that case, the strain gauge may be formed in the substrate (e.g. in a semiconducting substrate such as silicon) by selectively doping the strain sensing pattern into the substrate. This can give rise to highly accurate patterns for the strain sensing area.

Preferably, the temperature gauge is formed before or after the strain gauge by selective deposition onto the substrate or strain gauge. Again, various deposition techniques may be used, e.g. thin film techniques combined with patterning techniques may be used. The temperature gauge may be formed before application to the substrate, e.g. in the form of a foil temperature gauge. Usually, the temperature gauge is applied over the strain gauge with respect to the substrate.

Alternatively, the temperature gauge may be formed before or after the strain gauge by selective diffusion into the substrate or into a layer overlying the strain gauge. In that case, the temperature gauge may be formed in the substrate or in a layer covering the strain sensing area (e.g. in a semiconducting substrate or layer such as silicon) by selectively doping the temperature sensing pattern into the substrate or layer. This can give rise to highly accurate patterns for the temperature sensing area which can therefore be matched accurately (in terms of shape and/or spatial positioning) with the strain sensing pattern.

The strain gauge may be formed, at least in part, of a material comprising platinum and tungsten. Preferably, the material used is an alloy of platinum and tungsten such as Pt92/w8. However, the material for the strain gauge may be any material which has a suitably high gauge factor (GF), as explained in more detail below.

Certain strain gauge materials are known to have a high gauge factor (GF) and are thus useful where strain levels are low or measurements are made in a noisy environment. Unfortunately these materials often have a high temperature coefficient of resistance (TCR) and may have other undesirable thermal effects and are only suitable for dynamic measurements as the normal level of non-isothermal effects on a Wheatstone bridge produce large errors when used for static measurements. Combining resistance temperature gauges as described above with strain gauges made from these materials can allow their use for static measurements in non-isothermal conditions. A typical material of this type is platinum/tungsten alloy (such as Pt92/W8), which has a GF more than twice that of most metals. Disadvantageously it has almost ten times the problematic thermal effects, which has made this material non-desirable in the past for non-isothermal strain measurements.

Alternatively, the strain gauge may be formed, at least in part, of a material comprising silicon. Preferably, the material used is a doped silicon, doped in order to provide a preferential conducting path through the semiconducting silicon. A typical dopant suitable for this purpose is boron.

Silicon strain gauges, diffused or implanted into the surface of a Silicon wafer, have the advantage that areas of the wafer can be configured as mechanical flexures and, using standard integrated circuit technologies, a pressure diaphragm or accelerometer beam complete with appropriately sited strain gauges, connections and passivation can be produced in a small area of the wafer. Using the benefits of batch processing around 1000 units can be produced on one wafer which is very cost effective and automotive applications include transducers for engine and airbag controllers. It is recognised that this type of transducer, whilst reliable and stable, is subject to thermal errors and its use is restricted to low cost/low accuracy applications. However, when used in combination with the present invention, this type of transducer can be improved in its current applications and its use extended to other applications requiring accuracy in non-isothermal conditions. This can be achieved by depositing temperature gauges on Silicon strain gauges at the time of manufacture and incorporating the temperature signals generated by them in a temperature compensation scheme in accord with the present invention.

Typically, the temperature gauge is formed, at least in part, of a material comprising nickel or platinum. This is explained in more detail below.

Normally, the resistance temperature gauge can be manufactured using the same plant and techniques as the strain gauge, and if desired the strain gauge manufacturer can carry out the overlay bonding or depositing at the time of manufacture, to produce a single assembly of strain gauge and temperature gauge for the convenience of the user. In the case of deposited or implanted gauges the assembly of the gauges and bonding to the flexure can be achieved at the time of manufacture.

In a second aspect, the present invention provides an apparatus for outputting a temperature-compensated strain measurement, including a (or more than one) strain sensing apparatus according to the first aspect, and means for correcting the output from the strain gauge of said strain sensing apparatus using the output from the temperature gauge of said strain sensing apparatus.

Preferred features described with respect to the first aspect may be incorporated in this second aspect. In particular, the circuitry described with respect to the first aspect may be used with the second aspect.

In another aspect, the present invention provides a method of measuring strain using a strain sensing apparatus according to the first or second aspect, wherein the output from the strain gauge is corrected to give a temperature-compensated strain output according to the output from the temperature gauge.

Preferably, the strain is measured during a thermal transient applied to the strain sensing apparatus.

Several embodiments of the invention will now be described by way of example only, with reference to the accompanying drawings in which.

Figure 1:
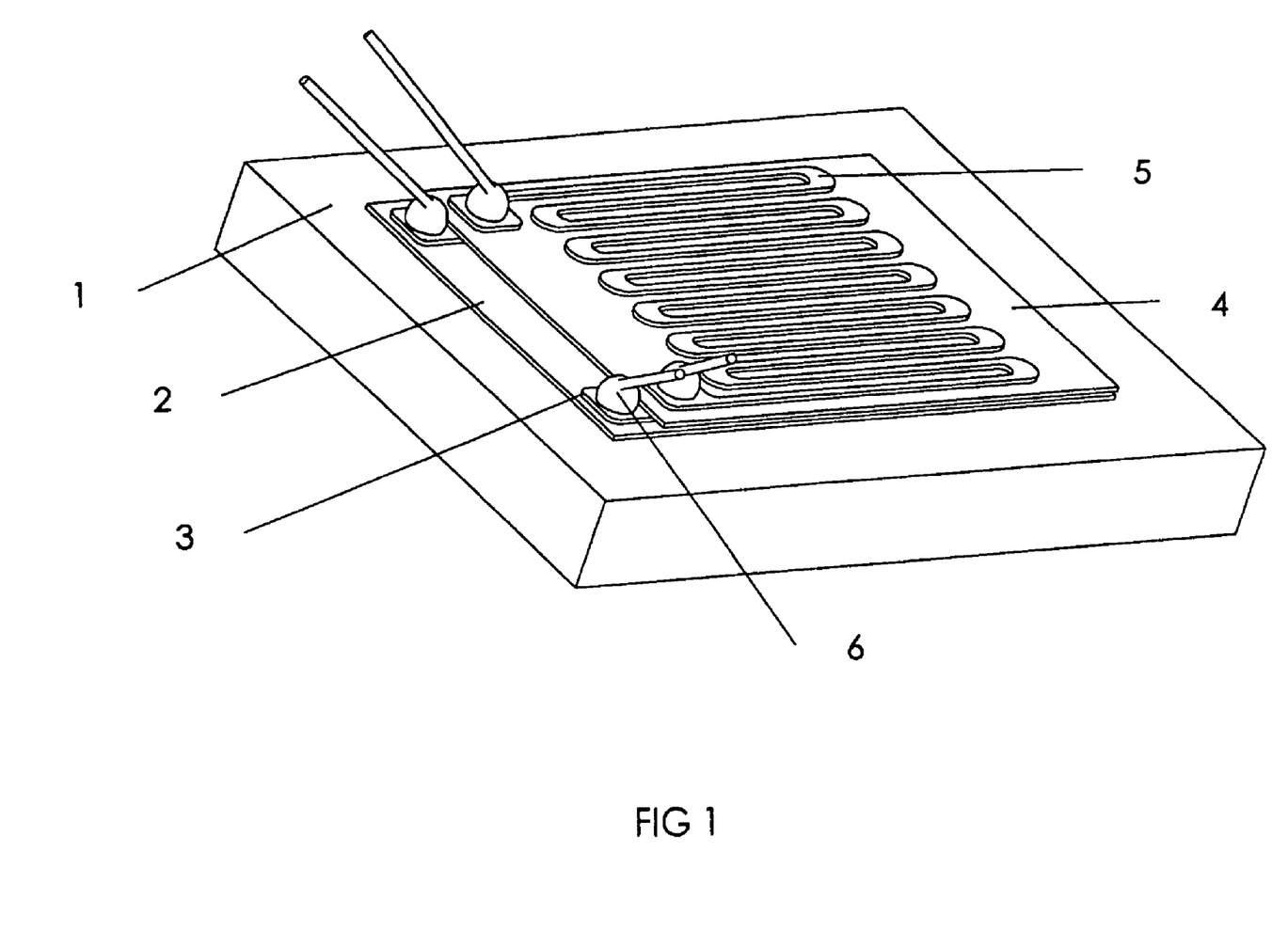
FIG. 1 shows a schematic view of an apparatus according to one embodiment of the invention, having a single strain gauge and compensating temperature gauge.

Referring first to FIG. 1, an apparatus or installation consisting of a substrate 1, a dielectric layer 2, a strain sensing grid 3, manufactured from a suitable metal alloy such as platinum/tungsten (Pt92/W8), another dielectric layer 4 and a temperature sensing grid 5, manufactured from suitable metal such as nickel. The substrate 1 and the layers 2, 3, 4 and 5 are securely bonded together using adhesive, deposition, implantation or diffusion techniques and it is usual to seal the assembly with a overall protective layer appropriate to the application. The temperature gauge dielectric layer 4 is preferably manufactured from the same material as the strain gauge dielectric layer 2 and should be as thin as practical. The temperature sensing grid pattern 5 and the strain sensing grid pattern 3 are identical and coincident in the plane of the substrate in order to provide the best temperature tracking. Electrical connection to the gauges can be made by fine wire bonding or soldering at solder pad 6.

Figure 2:
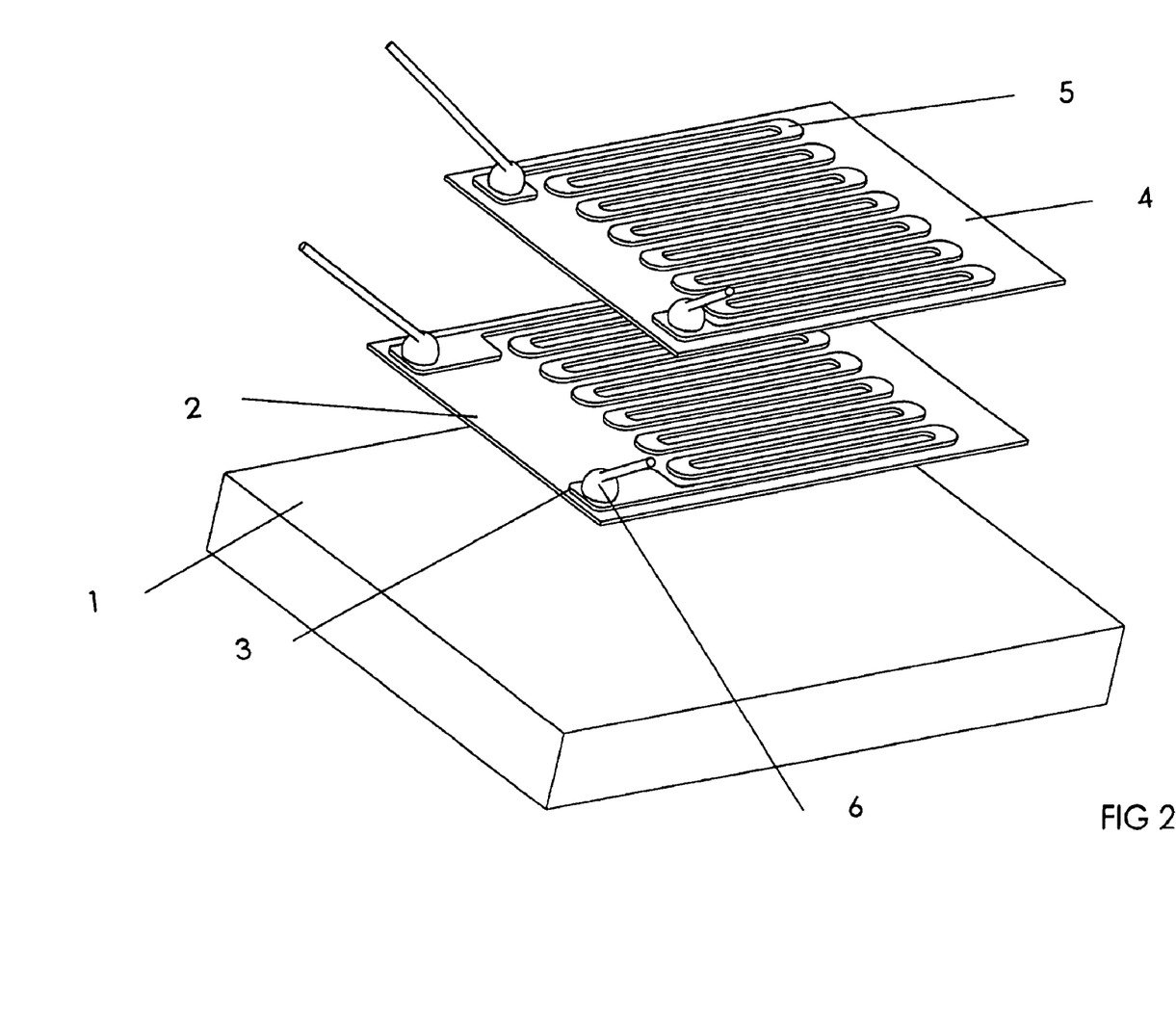
FIG. 2 shows an exploded view of the apparatus of FIG. 1.

FIG. 2 is an exploded view of the assembly of FIG. 1 showing the sub-assemblies of the strain gauge and temperature gauge separated for clarity.

Figure 3:
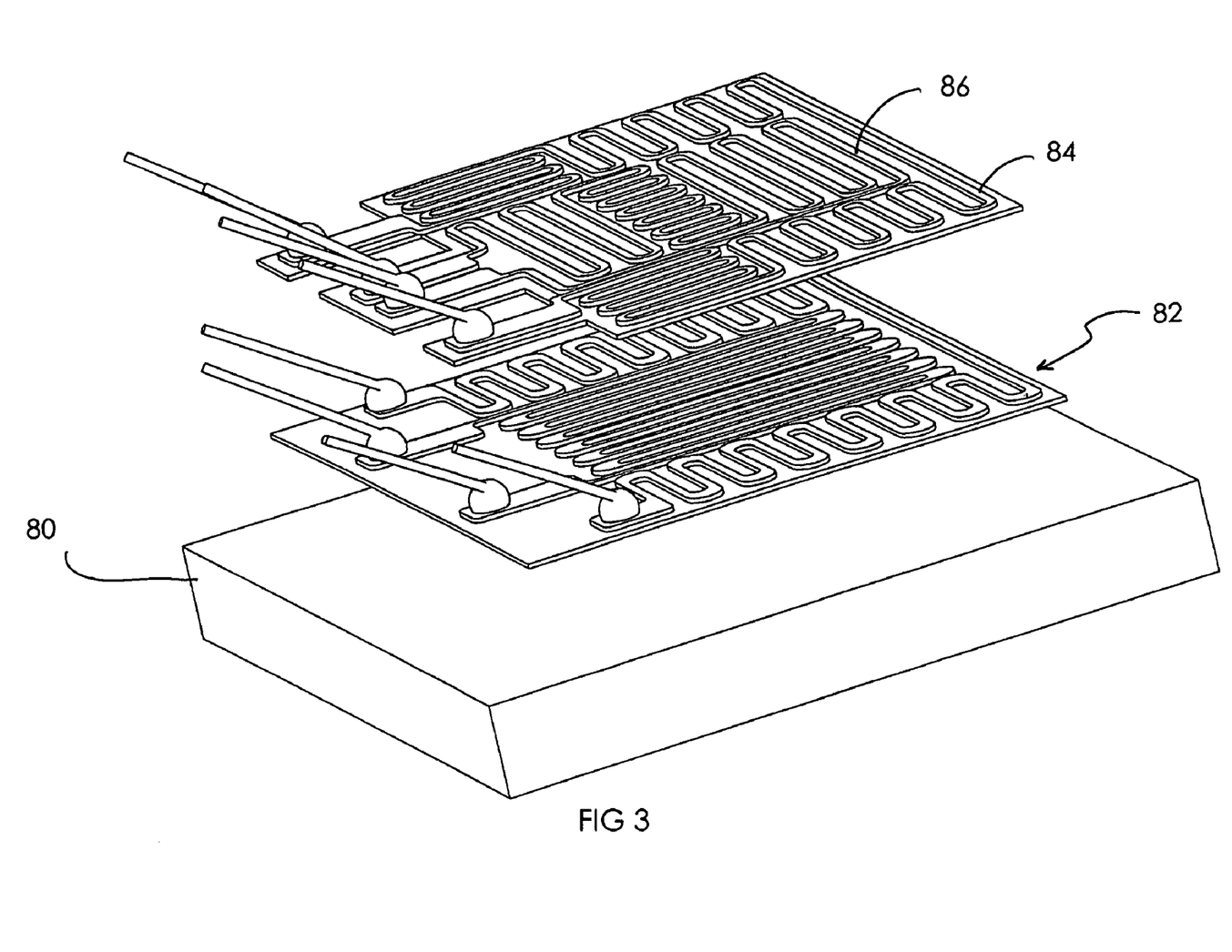
FIG. 3 shows a schematic, exploded view of an apparatus according to another embodiment of the invention, having a dual strain gauge pattern for measuring compressive strain, to be used, for example, in column load cells, with a companion temperature gauge.

FIG. 3 shows a dual strain gauge 82 which can be used to measure compressive strain (e.g. planar) in column type load cells with companion resistance temperature gauges 84,86. The grid patterns of the temperature gauges 84,86 are designed to exploit Poisson's effect in the substrate so that when subjected to a strain on the longitudinal axis of the strain gauge grid the net change in resistance is zero. This is useful if the strain sensing ability of the temperature sensing alloy results in a significant error in temperature sensed when the substrate is strained. The grid pattern can be designed on a theoretical basis and corrected empirically to achieve zero resistance change when strained for a given substrate, such as stainless steel. The grid design will generally vary with Poisson's ratio and once established for a material should remain constant. There are various patterns that can achieve this and the pattern shown is one of many. The pattern area and shape should, preferably, substantially mimic the strain gauge 82 as shown. In some cases, where tensile and compressive strains exist in close proximity, such as a pressure diaphragm or shear beam, the temperature gauge grid can be designed to exploit this, as shown in FIG. 5, and achieve zero net strain output.

Figure 4:
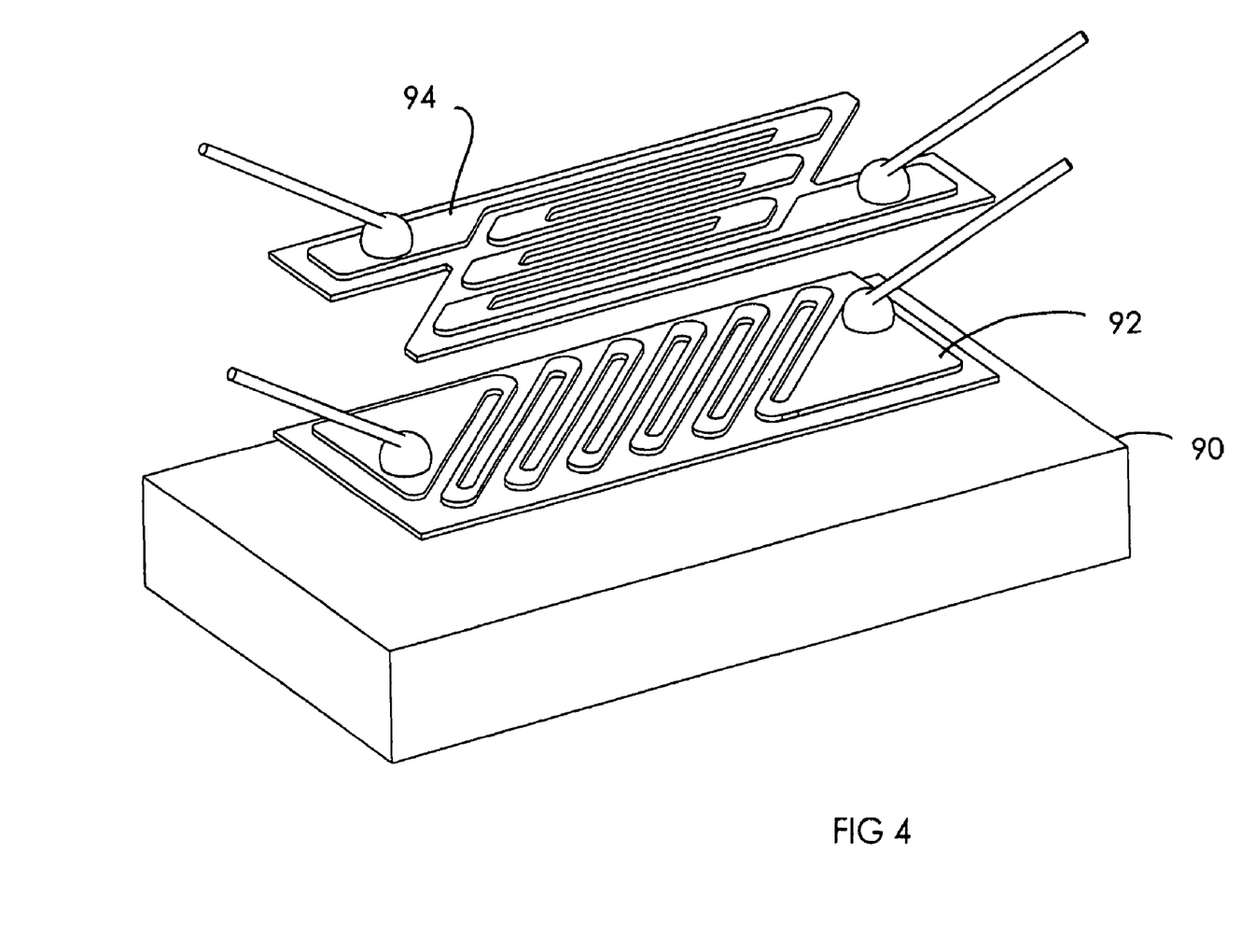
FIG. 4 shows a schematic, exploded view of an apparatus according to another embodiment of the invention, having a strain gauge pattern for measuring shear strain, to be used, for example, in torque cells and load cells, with a compensating temperature gauge overlay.

FIG. 4 shows a strain gauge 92 which can be used for sensing shear strain in load or torque cells with a temperature gauge overlaid and designed according to the zero strain rules.

Figure 5:
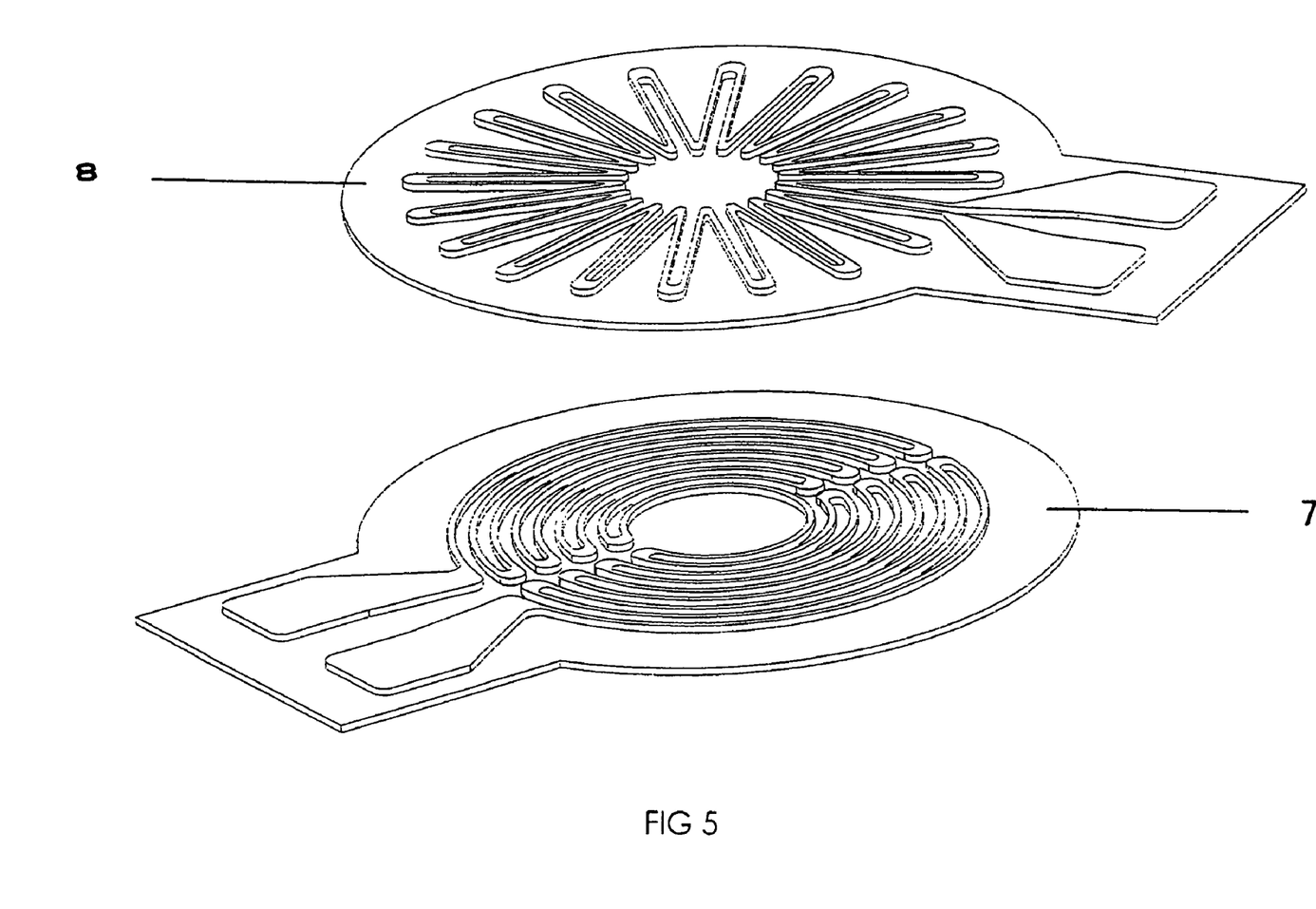
FIG. 5 shows a schematic, exploded view of an apparatus according to another embodiment of the invention, having as strain gauge pattern for use with a pressure transducer diaphragm, with a compensating temperature gauge overlay.

FIG. 5 shows a strain gauge 7 and temperature gauge 8 designed for a circular pressure diaphragm to give an embodiment of the invention which exploits the strain distribution in the diaphragm (not shown). The strain gauge 7 senses tangential strain in the diaphragm which is zero at the edge of the diaphragm and maximum tensile at the centre. The temperature gauge 8 covers the same area but senses radial strain, which varies from maximum compressive at the edge of the diaphragm to maximum tensile at the centre. The length and position of the radial pattern is designed so that the net radial strain sensed is zero.

Figure 6:
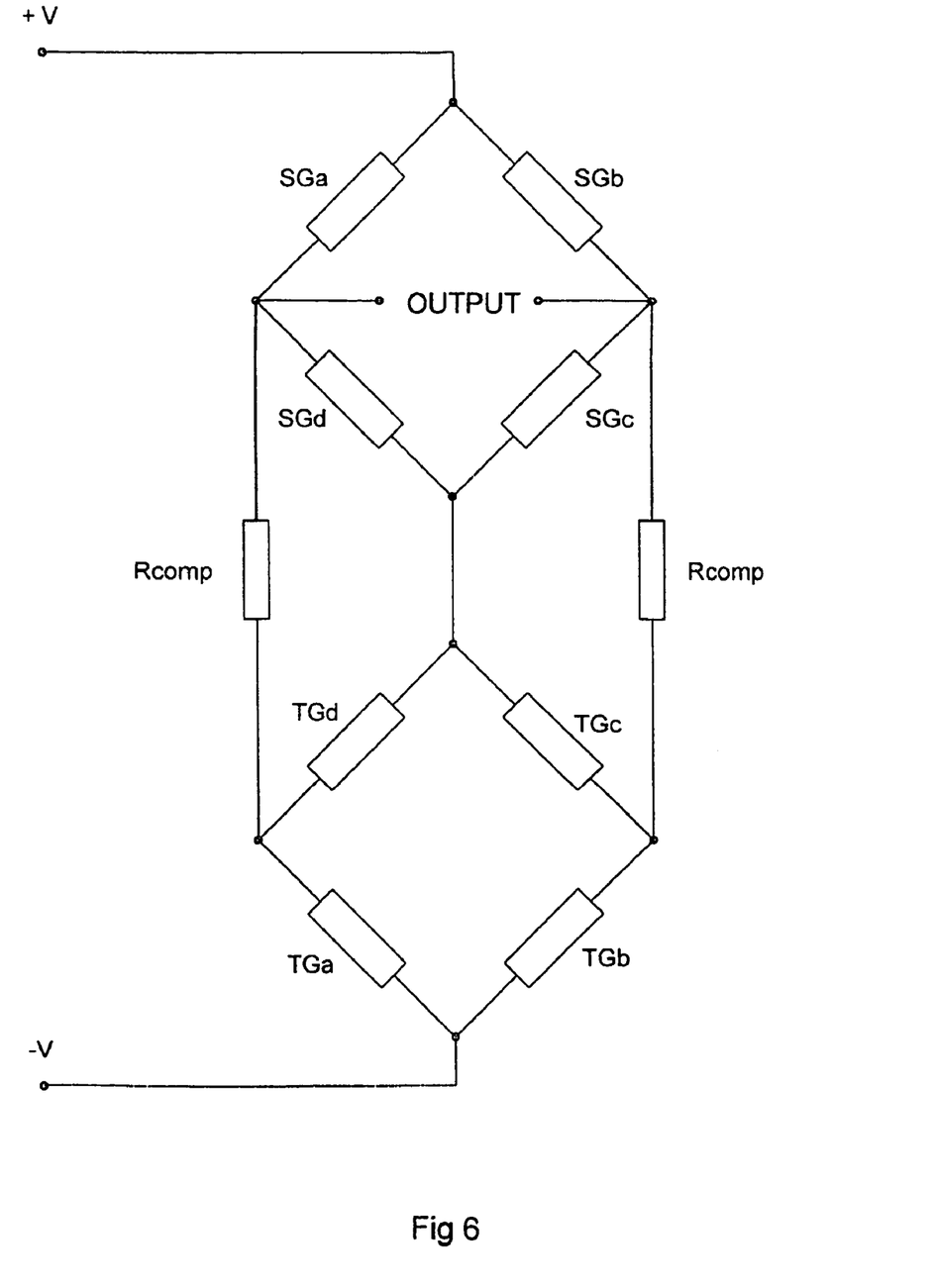
FIG. 6 shows a circuit for use with or in an embodiment of the invention, wherein compensation is achieved by analogue techniques.

FIG. 6 shows a circuit employing four strain gauges (SGa, SGb, SGc and SGd) and companion temperature gauge overlays (TGa, TGb, TGc, TGd) wired as two Wheatstone bridges connected in series. The temperature gauge bridge is wired as a mirror image of the strain gauge bridge so that the outputs due to temperature imbalance on the substrate are in opposition. The resistors Rcomp are set empirically or by calculation so that the output at the strain bridge due to thermal imbalance is zero. Under isothermal conditions there will be no output from either bridge in zero strain condition; when the substrate is strained only the strain bridge will output. It is also possible to wire the bridges in parallel and many permutations for compensation are possible using passive and active components.

Figure 7:
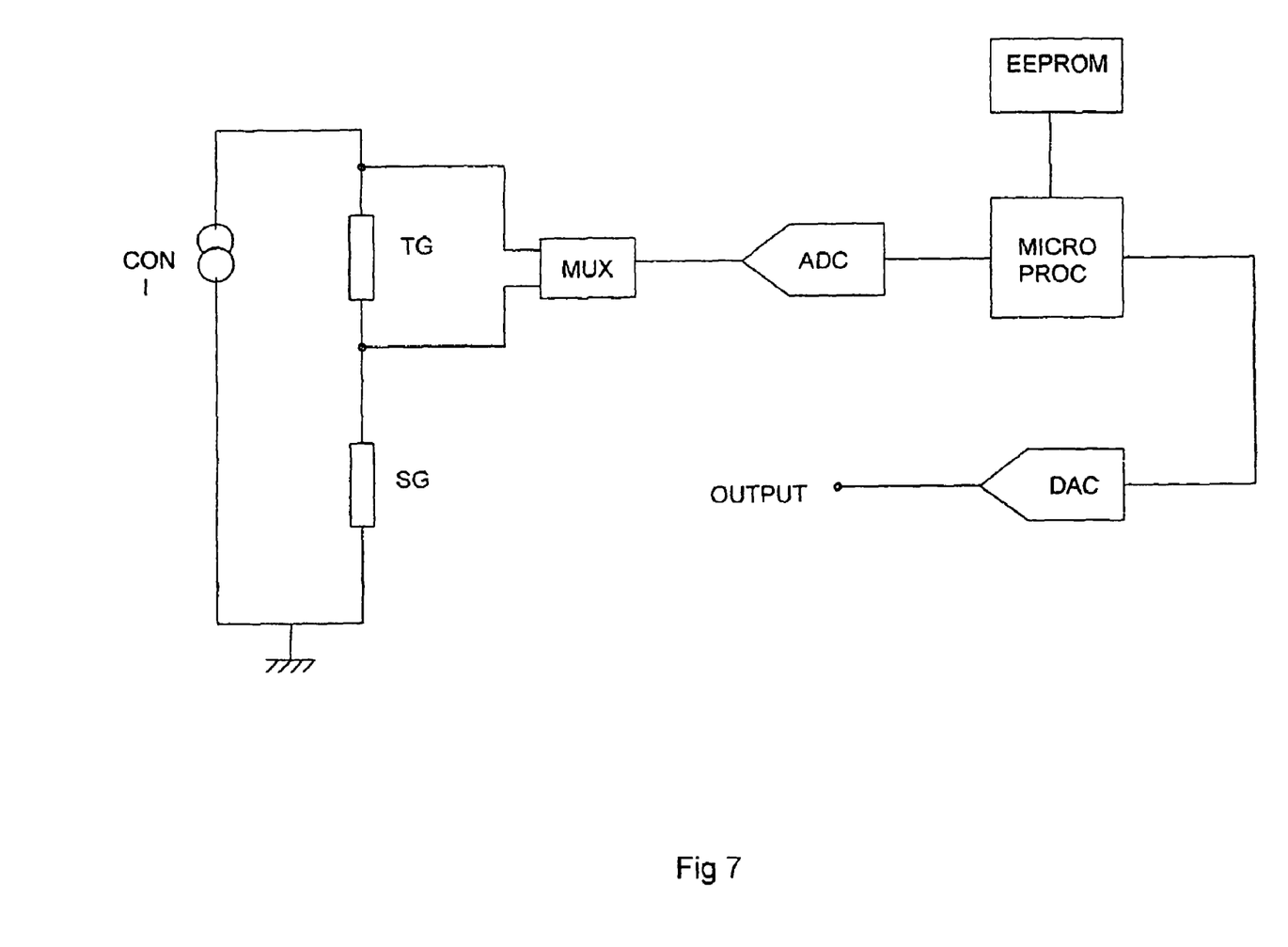
FIG. 7 shows a circuit for use with or in an embodiment of the invention, wherein compensation is achieved using digital techniques.

When active components are used it is possible to dispense with the Wheatstone bridge circuit and accomplish temperature compensation with only one strain gauge and its temperature gauge companion. A system for achieving this is shown in FIG. 7. A precision constant current source CON I biases TG and SG and the signals from same are alternatively multiplexed by MUX before analogue to digital conversion by ADC. This enables the signal data to be processed by a microprocessor MICRO PROC and after processing the data is converted to an analogue signal by the digital to analogue converter DAC so that common analogue instruments can be used to read the corrected data. The system is calibrated empirically at several points in the temperature/strain envelope in a test rig capable of applying strain and temperature simultaneously or independently to the sensing substrate or flexure and the test point constants stored in non-volatile memory EEPROM. In service the signals from TG and SG are monitored and the strain signal is corrected for temperature effects by the microprocessor using the test constants stored in EEPROM prior to analogue conversion.

Figure 8:
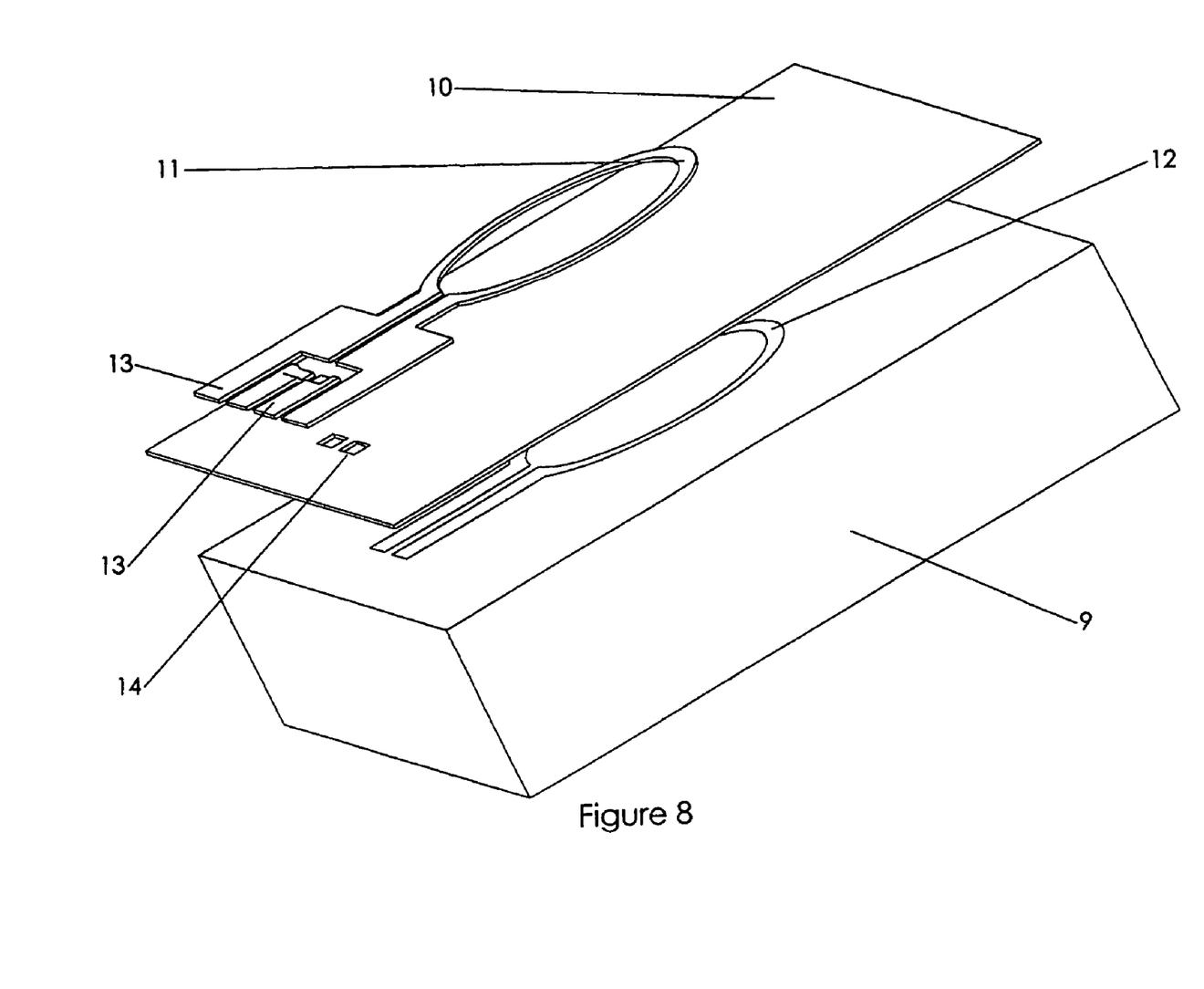
FIG. 8 shows a schematic, exploded view of an apparatus according to another embodiment of the invention, having a silicon pressure sensor diaphragm wherein single strain and temperature sensing elements are employed, these having been manufactured using silicon integrated circuit technology.
Figure 9:
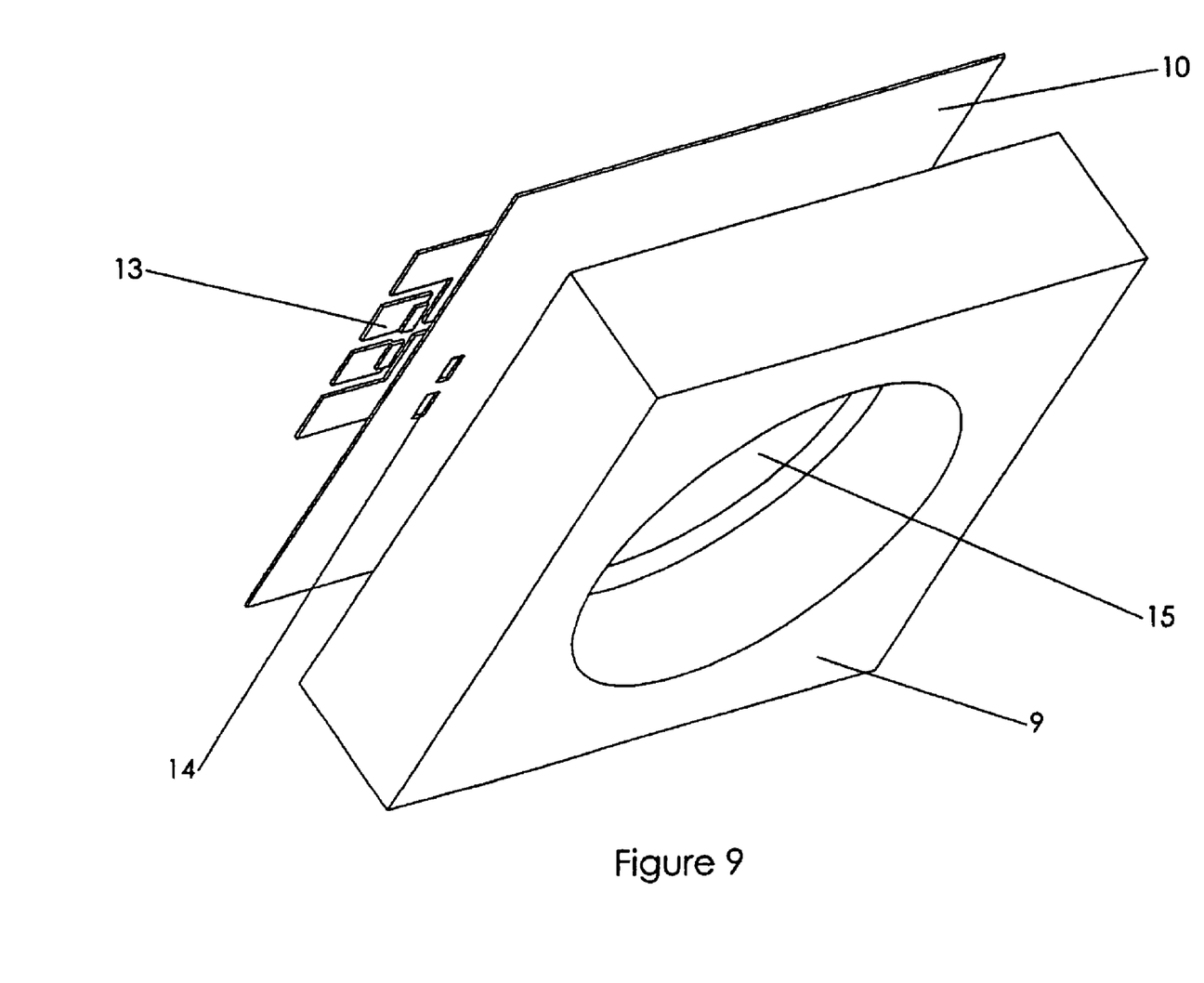
FIG. 9 shows the apparatus of FIG. 8, viewed from the underside to show the diaphragm forming cavity.

The ability to employ a single strain gauge/temperature gauge pair as a compensated measuring solution is particularly useful in the case of silicon pressure transducers. The manufacture of silicon integrated circuits does not lend itself to the production of precise silicon resistors and using four resistors in a Wheatstone bridge circuit does not necessarily guarantee sufficient precision. The single strain gauge/temperature gauge pair does not require precision in the components, relying instead on stability, tracking and calibration for accuracy. The solution is also simpler, more reliable and should lead to higher yields, which converts to lower costs with improved performance. Referring to FIG. 8, the silicon die 9 has strain sensing resistor 12 diffused or implanted into the surface. The shape and position of the resistor is designed to sense tangential strain in the circular diaphragm 15 (formed in the die by the cavity shown in FIG. 9) when pressure is applied to it. A thermal oxide passivation layer 10 is formed over the strain sensing resistor and two small apertures 14 aligned with the strain resistor terminals are etched in it using established techniques utilising photo configurable sacrificial layers. The temperature sensing resistor 11 is deposited on layer 10 and is configured, using photo techniques as above, so that the sensing ring is exactly the same shape, size and position as the strain sensing resistor sensing ring below it. The temperature sensing resistor is manufactured from a suitable material such as nickel or platinum. The terminations 13 of the resistors can be formed by photo configuring this layer in the same operation as shown in FIG. 8.

Figure 10:
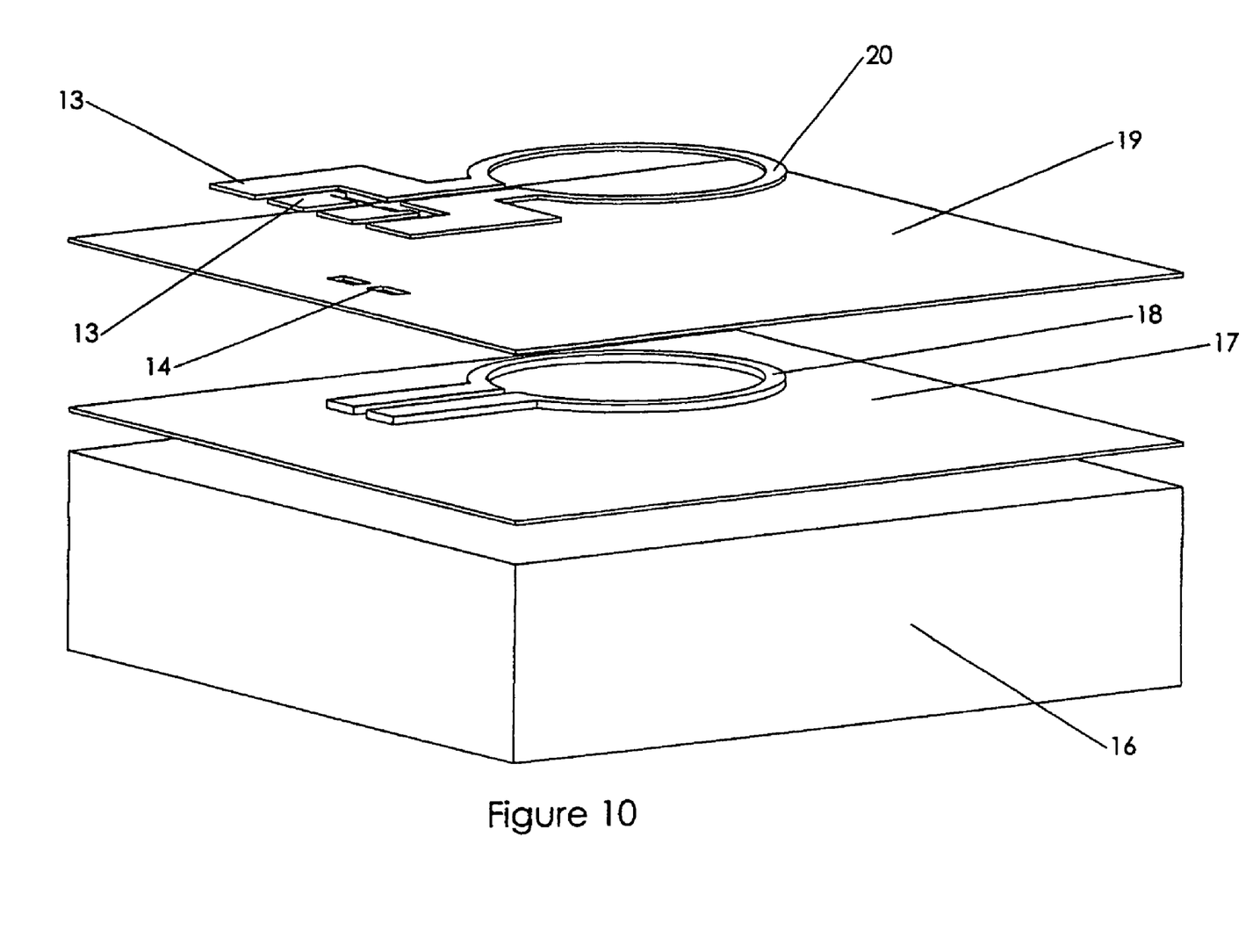
FIG. 10 shows a schematic, exploded view of an apparatus according to another embodiment of the invention, having a pressure sensor diaphragm wherein single strain and temperature sensing elements are employed, these having been manufactured using thin film deposition techniques.

A similar assembly can be manufactured using thin film techniques as shown in FIG. 10 where the substrate 16 can be manufactured from a material able to resist chemical attack from the pressure medium such as stainless steel. The circular diaphragm can be formed in the substrate in a similar manner to that shown in FIG. 9. The dielectric layer 17 is formed on the substrate and the strain sensing resistor 18 is deposited on it and configured either by etching or depositing through a mask. A wide choice of suitable materials for the strain sensing resistor is available by virtue of the sputtering process. One such material is platinum tungsten alloy (Pt92/W8). The second dielectric layer 19 is formed over the sensing resistor and photo configured by well established techniques to provide the termination apertures 14. The temperature sensing resistor 20 is deposited on the dielectric layer and configured using the same technique as that used to configure the strain sensing resistor so that the sensing ring is exactly the same shape, size and position as the strain sensing resistor ring below it. The terminations 13 of the resistors can be formed when this layer is configured. Suitable materials for the temperature sensing layer include nickel or platinum.

What is claimed is:

1. A strain sensing apparatus having:
    a strain gauge having a layer to which a strain sensing area is bonded;
    a temperature gauge having a layer to which a temperature sensing area is bonded, the temperature sensing area being in thermal contact with the strain sensing area; and
    wherein one of the strain sensing area and the temperature sensing area overlies the other, the temperature gauge being directly bonded to the strain gauge.

2. A strain sensing apparatus according to claim 1 wherein the layer to which the strain sensing area is bonded and/or the layer to which the temperature sensing area is bonded is a dielectric material layer.

3. A strain sensing apparatus according to claim 1 wherein the strain sensing area and the temperature sensing area substantially match in size and are overlaid substantially to coincide.

4. A strain sensing apparatus according to claim 1 wherein the strain gauge has a strain sensing pattern and the temperature gauge has a temperature sensing pattern of substantially the same shape, the gauges being overlaid substantially to match the patterns.

5. A strain sensing apparatus according to claim 1 wherein the strain gauge has a strain sensing pattern and the temperature gauge has a temperature sensing pattern selected to complement the strain sensing pattern.

6. A strain sensing apparatus according to claim 5 wherein the temperature sensing pattern is selected so that, in use, when subjected to a predetermined non-zero strain or to a predetermined non-zero strain format, the temperature gauge has substantially zero net strain output.

7. A strain sensing apparatus according to claim 1 wherein the strain gauge is formed on a substrate by selective deposition.

8. A strain sensing apparatus according to claim 1 wherein the strain gauge is formed on or in a substrate by selective diffusion or implantation into the surface of the substrate.

9. A strain sensing apparatus according to claim 7 wherein the temperature gauge is formed before or after the strain gauge by selective deposition onto the substrate or strain gauge.

10. A strain sensing apparatus according to claim 8 wherein the temperature gauge is formed before or after the strain gauge by selective diffusion into the substrate or into a layer overlying the strain gauge.

11. A strain sensing apparatus according to claim 1 wherein the strain gauge is formed, at least in part, of a material comprising platinum and tungsten.

12. A strain sensing apparatus according to claim 1 wherein the strain gauge is formed, at least in part, of a material comprising silicon.

13. A strain sensing apparatus according to claim 1 wherein the temperature gauge is formed, at least in part, of a material comprising nickel or platinum.

14. A strain sensing apparatus according to claim 1, comprising
    means for correcting the output from the strain gauge of said strain sensing apparatus using the output from the temperature gauge of said strain sensing apparatus.

15. A method of measuring strain using apparatus according to claim 1, wherein the output from the strain gauge is corrected to give a temperature-compensated strain output according to the output from the temperature gauge.

16. A method according to claim 15 wherein the strain is measured during a thermal transient applied to the strain sensing apparatus.

17. A strain sensing apparatus having:
    a strain gauge comprising a layer having a strain resistor;
    a temperature gauge comprising a layer having a temperature compensation resistor, the temperature compensation resistor being in thermal contact with the strain resistor; and
    wherein one of the strain resistor and the temperature compensation resistor area overlies the other, the temperature gauge being directly bonded to the strain gauge.

18. The strain sensing apparatus of claim 17 wherein the strain resistor and the temperature compensation resistor substantially match in size and are overlaid substantially to coincide.

19. The strain sensing apparatus of claim 17 wherein the strain gauge has a strain sensing pattern and the temperature gauge has a temperature sensing pattern of substantially the same shape, and the strain gauge and temperature gauge are overlaid substantially to match the patterns.

20. The strain sensing apparatus of claim 17 wherein the strain gauge has a strain sensing pattern and the temperature gauge has a temperature sensing pattern selected to complement the strain sensing pattern.

* * * * *